Leon Harlan Ivy
INVENTOR.

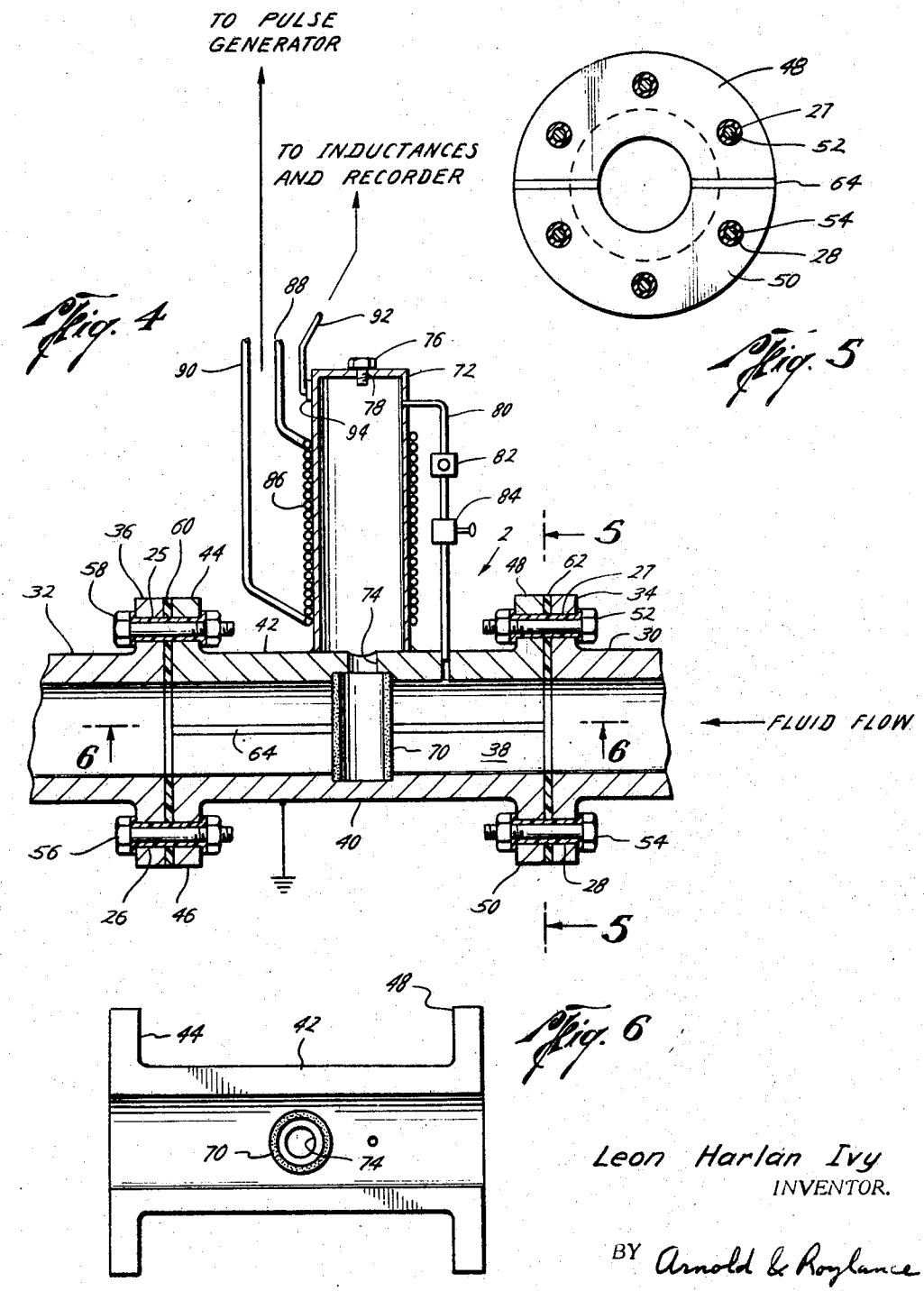

3,508,435
MOISTURE MEASURING SYSTEM
Leon Harlan Ivy, 2422 Tangley, Houston, Tex. 77005
Filed Aug. 25, 1966, Ser. No. 575,140
Int. Cl. G01n 9/36
U.S. Cl. 73—61.1                              9 Claims

ABSTRACT OF THE DISCLOSURE

This invention relates to improved apparatus for measuring the proportion of moisture in a flowing stream of fluid. A cylindrical body of desiccant material is immersed in the fluid, and is interconnected between two electrodes subjected to a fixed charge to form the dielectric proportion of a capacitor. The capacitance may be measured as a function of the moisture in the fluid, since the dielectric character of the cylinder varies only according to the amount of moisture absorbed or adsorbed from the fluid stream. Purging means is therefore included to compress the contents of the cylinder during intermittent discrete time intervals, whereby excess build-ups of moisture are continually expelled from the cylinder, and whereby the moisture proportion in or on the cylinder does not significantly exceed the proportion of moisture in the fluid stream.

---

This invention relates to apparatus for measuring the change in the capacity of a capacitor when material of a different dielectric constant is introduced into the space between the capacitor electrodes, and more particularly relates to apparatus for measuring the proportion of a preselected material present in a fluid flowing between such electrodes. In particular, this invention is directed to improved apparatus for accurately measuring the proportion of a preselected substance, such as water, in a flowing stream of hydrocarbon fluids such as oil or gasoline.

It is often necessary to continuously monitor a flowing fluid stream in order to continuously detect and measure the proportionate amount of a preselected substance in the stream. If this stream is confined in an enclosure such as a pipeline, there is an obvious problem since direct access to the fluid is impractical if not impossible, especially if the fluid is confined under high-pressure.

For example, the presence of even traces of water is undesirable in certain intermediate or terminal liquid streams in petroleum refineries. Some of these streams are subsequently treated with water-sensitive reagents such as alkylation or polymerization catalysts, and the presence of only a few parts per million of water in these streams will inactivate a substantial quantity of the catalyst. This, of course, will result in a very low yield of the end-product sought to be obtained.

Extensive experience has proved that the taking of test samples is a completely unsatisfactory solution to this problem, since good sample-taking requires extreme care by experienced personnel, and since abrupt changes in the constituency of the fluid in question can occur without warning. Accordingly, such fluids are preferably constantly monitored in situ, in order that maximum quality control can be obtained.

Although several different monitoring techniques are presently available, it would appear that the best technique is to continuously measure the magnitude of changes produced in the electrical capacitance of a remote capacitor immersed in the stream, wherein the fluid functions as the dielectric in the capacitor. More particularly, a suitable sorber or sorption device is disposed in the stream between the capacitor electrodes, and the capacitance across the electrodes is measured continuously with the sorber functioning as the dielectric. Thus, a desiccant (for example) will adsorb a representative portion of any water particles which may be present in the fluid flowing past the desiccant, and such adsorption will effect a change in the dielectric characteristic of the desiccant proportional to the quantity of water absorbed by the desiccant. Accordingly, a change in the measured capacitance will be produced which is proportional to the change in the dielectric characteristic of the desiccant, and these changes can be monitored and recorded in a conventional manner. If desired, circuitry can be employed to control or even shutdown selected portions of the system, in response to preselected indications provided by the monitoring equipment.

Although the monitoring equipment hereinbefore described has been commercially accepted and is now widely used for many different industrial purposes, the equipment now being used has one disadvantage which adversely affects the accuracy of the measurements sought to be obtained. It will be apparent that changes in capacitance are due to the amount of water which has been collected and adsorbed by the desiccant, and after the desiccant has continued to collect and adsorb water over a period of time, the capacitance being measured is not proportional to the water actually present in the flowing stream. Instead, the measured capacitance will indicate a much greater proportion of water than is actually present in the stream since the water collected on the desiccant is greater in concentration than the water in the flowing stream.

A further disadvantage with conventional measuring apparatus is that the mass of desiccant, which is intended to act as the dielectric, will tend to absorb as well as adsorb water particles from the stream of fluid. This absorption tends to clog the pores of the mass of desiccant, thus altering both its adsorption capability as well as add to the total volume of water accumulated, and thus measurements of the capacitance provided by the capacitor will further inaccurately indicate the proportion of water actually present in the fluid in which the desiccant is immersed.

It should be understood that this type of apparatus is used for monitoring the presence of substances other than water. However, the foregoing problems are present irrespective of what kind or type of substance is sought to be monitored.

These disadvantages of the prior art are overcome with the present invention, and novel methods and apparatus are provided herein for more accurately measuring the proportion of a preselected substance in a flowing stream. More particularly, novel means and methods are provided for cyclically cleansing or purging absorbed and adsorbed particles from the sorber during short preselected discrete time intervals, whereby accurate measurements of capacitance can be obtained during the time period between such purging.

These and other advantages and features of the present invention will be apparent from the following detailed description, wherein reference is made to the figures in the accompanying drawings. In the drawings:

FIGURE 4 is a pictorial representation, partly in cross section, of a portion of the system depicted in FIGURE 3.

FIGURE 5 is a pictorial representation of a portion of the apparatus depicted in FIGURES 3 and 4.

FIGURE 6 is another pictorial representation of a portion of the apparatus depicted in FIGURES 3 and 4.

Figure 1:
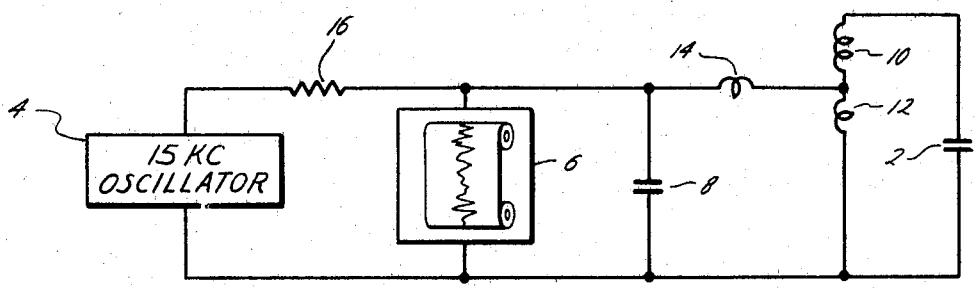
FIGURE 1 is a schematic representation of the basic electronic circuit employed to measure the proportion of a preselected substance in a flowing stream of fluid.

Referring now to FIGURE 1, there may be seen a schematic representation of the basic circuitry for deriving a continuous indication of the proportion of a preselected substance, for example water, present in a stream of fluid flowing in a pipeline. In particular, the circuitry may be seen to include the basic capacitor 2 which is disposed in situ in the fluid stream, a suitable oscillator 4 such as one operating at a frequency of 15 kilocycles, a conventional chart recorder 6 which is connected across the oscillator 4 and which is adapted to respond functionally to voltage variations, a second capacitance 8 connected across the terminals of the voltage recorder 6, a pair of inductances 10 and 12 connected in series with each other and across the terminals of the capacitor 2, and a third inductance 14 interconnected between one terminal of capacitance 8 and the junction of inductances 10 and 12. A load resistance 16 is also shown connected between the oscillator 4 and the voltage recorder 6.

It should be understood that capacitance 2 may be remotely located with respect to the other circuit components depicted in FIGURE 1. Thus, inductances 10 and 12 form an auto-transformer, and capacitance 8 includes the capacitance of the transmission cable which is not depicted in FIGURE 1. Power is supplied by the oscillator 4 at a constant or fixed rate, and thus the voltage generated across the recorder 6 will be directly proportional (within limits as will hereinafter be explained) to the capacitance of capacitor 2.

The system depicted in FIGURE 1 is usually calibrated to the capacitance of capacitor 2, when no water (or other preselected substance) is present in the dielectric of capacitor 2. Thus, changes in the voltage across the recorder 6 will only occur from changes in the dielectric of capacitor 2.

Figure 2:
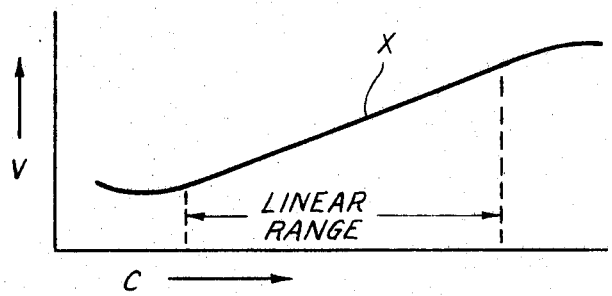
FIGURE 2 is a graphical representation of the relationship employed in the operation and use of the circuitry depicted in FIGURE 1.

Referring now to FIGURE 2, there may be seen a graphical representation of the relationship of the voltage across the recorder 6 to the capacitance of capacitor 2, wherein V represents the voltage and wherein C represents such capacitance. Curve X shows how this relationship is linear within a broad operating range which may be as great as 400 to 500 picofarads and even broader. As hereinbefore stated, inductances 10 and 12 form an auto-transformer, and capacitance 8 includes the capacitance of a transmission cable, if one is used. The initial dip in curve X occurs when the reflected capacitance of capacitor 2 across inductance 12 forms a series resonant circuit with inductance 14. The impedance across inductance 12 increases as C increases. When C is very large, capacitor 2 and inductance 14 form a parallel resonant circuit. Between these two conditions for parallel and series resonance, however, V is clearly linearly proportional to C.

The linear range of the circuit depicted in FIGURE 1 can be extended by reducing the Q of the resonant circuit by means of a shunt resistance (not depicted) across capacitor 2. A conventional voltmeter may be added to, or substituted for, the chart recorder 6 depicted in FIGURE 1. Alternatively, conventional switching or control circuitry may be made responsive to the voltage developed across the recorder 6, as hereinbefore mentioned.

Figure 3:
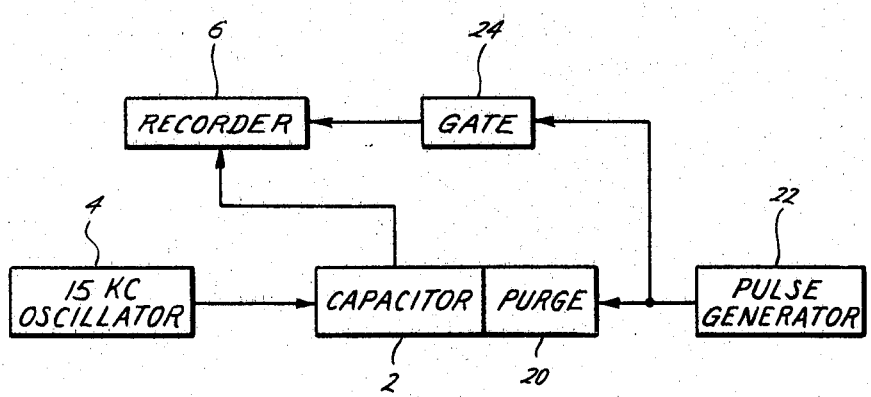
FIGURE 3 is a functional diagram of a testing system embodying the basic concept of the present invention.

Referring now to FIGURE 3, there may be seen a functional diagram of a system for measuring the proportion of a preselected substance, such as water, which is present in a flowing stream of a fluid such as oil or gas, and which system includes provision for periodically purging the aforementioned sorber during preselected time intervals. In particular, there may be seen the 15 kilocycle oscillator 4 and sensing capacitor 2, which are depicted together with the recorder 6 in FIGURE 1. Also shown in FIGURE 3, in functional relationship with capacitor 2, is a purge 20 for discharging or purging the sorber (not depicted in FIGURES 1–3) in the sensing capacitor 2. A pulse generator 22, which is preferably adjusted to develop sharp voltage pulses at a frequency of 1–10 per second (depending of the character and velocity of the fluid) is connected to actuate the purge 20 momentarily at preselected regular intervals corresponding to the pulse frequency of the pulse generator 22.

It should be noted that measurements are preferably not taken during purging of the sorber in the sensing capacitor 2. Accordingly, a gate 24, which may be any suitable gating means such as a conventional univibrator circuit, may also be interconnected to the output of the pulse generator 22, to disable or inactivate the recorder 6 during a preselected interval following the occurrence of each pulse from the pulse generator 22. Thus, the measurements provided by the sensing capacitor 2 are recorded only during the intervals between each activation of the gate 24.

Referring now to FIGURE 4, there may be seen two joints of pipe 30 and 32 having flanges 34 and 36 which are coupled together by means of the sensing capacitor 2 which is functionally represented in FIGURES 1 and 3. As may be seen, the sensing capacitor 2 is composed of a chamber 38 formed by semi-cylindrical lower housing 40 and a semi-cylindrical upper housing 42, which are each provided with end coupling flanges 44, 46, 48 and 50. It is essential to the operation of the present invention that housings 40 and 42 be electrically insulated from each other, although they are preferably clamped together in a fluid-tight manner. Thus, bolts 52, 54, 56 and 58, which join flanges 44 and 46 to flange 36 and flanges 48 and 50 to 34, are separated by insulating gaskets 60 and 62, respectively. In addition, gasket 64 operates to electrically isolate housing 40 from housing 42. Assuming that all such components are clamped together in a fluid-tight manner, fluid can flow between pipe joints 30 and 32, by way of chamber 38, without interruption or leakage. Bolts 52, 54, 56 and 58 are preferably isolated from the flanges 34, 36 and 44–50, by insulators 25–28 to maintain the isolation of housings 40 and 42.

As may be seen in FIGURE 4, there is a sorber which is desiccant 70, which may be formed in the manner of a porous cylinder, disposed in the center of the chamber 38 between housings 40 and 42, so as to be immersed in fluid flowing through the pipe joints 30 and 32. Since the sorber is intended to attract water particles, the desiccant 70 is preferably composed of a compressed aluminasilicate, such as $Na_{12}(AlO_2)_{12}(SiO_2)_{12}$, with a preselected porosity, so as to have a predetermined absorption and adsorption capability. Accordingly, the desiccant 70 is preferably a molecular sieve.

The upper housing 42 may also be seen to include a hollow metal cylinder 72, having its interior cavity interconnected with the interior of the desiccant 70 by means of a port 74 in the upper housing 42, and having its upper end closed except for a fill port 78 containing a fill plug 76. The interior of the cylinder 72 is also interconnected to the chamber 38 by a hollow equalizer line 80 having a check valve 82 and equalizer valve 84. A solenoid 86 is provided about the cylinder 72, and is connected to the pulse generator depicted in FIG- URES 1 and 3 by means of leads 88 and 90. A further electrical lead 92 is provided to interconnect cylinder 72 and housing 42 to the inductances 10 and 12 and the recorder 6 depicted in FIGURE 1, by means of terminal 94.

As hereinbefore explained, it is desired to measure changes in the capacitance of the sensing capacitor 2 depicted in FIGURES 1 and 3, which changes are caused by changes in the dielectric characteristic of the fluid in pipe joints 30 and 32. It will be seen in FIGURE 4 that the sensing capacitor 2 is basically the upper and lower housings 40 and 42, the fluid and the desiccant 70 acting as the dielectric. Accordingly, if the recorder 6 is calibrated to indicate a proper reading for a fluid having a known content of the foreign or deleterious substance sought to be observed and measured, changes in the proportion of such substance (in the fluid flowing around and past the desiccant 70) will produce a proportional change in the capacitance of the sensing capacitor 2.

As has also been hereinbefore explained, an accurate measurement of the preselected substance sought to be monitored can only be obtained if the substance absorbed or adsorbed by the desiccant 70 is proportional to or representative of the proportion of substance in the fluid. It can be readily seen, however, that the desiccant 70 does not automatically release attracted particles, and thus means must be provided to periodically purge the desiccant 70. The cylinder 72 is fashioned to function with the solenoid 86 as a magneto-strictive transducer. Thus, each pulse from the pulse generator 22 operates to momentarily deform the cylinder 72 so as to momentarily squeeze the fluid inside the desiccant 70 out through its walls. This operation functions to flush out all accumulated particles of the substance sought to be measured. Accordingly, the dielectric characteristic of the sensing capacitor 2 is returned to normal immediately after each pulsation of the pulse generator 22.

It is necessary that the pressure in the cylinder 72 be equal to the pressure in the chamber 38. This is accomplished by the equalizing line 80 and equalizing valve 84. However, the check valve 82 is necessary to prevent backflow through the equalizing line 80 during pulsation of the pulse generator 22.

Referring now to FIGURE 5, there may be seen a pictorial view of one end of the upper and lower housings 40 and 42 depicted in FIGURE 4, whereby it may be seen how these two components are electrically isolated, one from the other, by means of the gasket 64 interposed therebetween. It may also be seen how bolts 52 and 54, which serve to join the flanges 48 and 50 to the adjacent pipe joint 30, are insulated from the flanges 48 and 50 (as well as from pipe joint 30) by means of gaskets 27 and 28. Thus, the bolts 52 and 54 are kept from providing an electrical path between the pipe joint 30 and either of the housings 40 and 42.

Referring now to FIGURE 6, there is depicted a pictorial representation of the lower surface of the upper housing 42 with its flanges 44 and 48, and further showing how the desiccant 70 is disposed, so as to encircle port 74 so as to be immersed in the fluid passing through the chamber 38, but also so as not to impede such flow. Consequently, the desiccant 70 can effectively "sample" all fluid flowing between pipe joints 30 and 32, by attracting and adsorbing or absorbing a representative amount of the moisture particles (for example) that are in the fluid during the periods between each pulsation or purging of the desiccant 70.

Although the sorber or sorption device referred to herein has been primarily described as a "desiccant," it should be clearly understood that the expression "desiccant" is used herein by way of example. It is preferable, for purposes of this invention, that the sorber be a molecular sieve. However, the molecular sieve must be composed of a material having an affinity for whatever substance is sought to be monitored, and thus it must be a desiccant only if water is the substance to be detected.

Other modifications and variations will become apparent from the foregoing description. For example, any suitable means such as a pump can be employed to periodically purge the desiccant 70. Accordingly, the methods and apparatus disclosed herein and depicted in the accompanying drawings, are intended to be illutrative only, and are not intended as limitations on the concept of this invention.

What is claimed is:

1. Apparatus for continuously measuring the proportion of a preselected constituent present in a flowing stream of fluid, said apparatus comprising
   a sorption member disposed in said flowing stream to collect portions of said fluid and amounts of said preselected constituent,
   a pair of electrodes arranged about said sorption member to form a capacitance wherein said sorption member is a dielectric, and
   purging means connected intermittently to apply a pressure to said sorption member to expel therefrom at least a portion of said collected fluid and said amounts of said preselected constituent.

2. Apparatus as described in claim 1, wherein said sorption member is filled with fluid and having a porous wall section, and
   wherein said purging means is connected intermittently to apply a pressure to said fluid in said sorption member to expel from within said sorption member at least a substantial portion of said fluid therein and at least a substantial portion of any of said preselected constituent previously collected from said flowing stream of fluid.

3. Apparatus as described in claim 2, wherein said pair of electrodes are arranged to form a conduit for said flowing stream of fluid, and
   wherein said purging means includes an electrically actuated compression means interconnected to apply a pressure to said fluid in said sorption member to expel at least a portion of said compressed fluid through said porous wall section of said sorption member.

4. Apparatus as described in claim 3, wherein said sorption member is formed in the manner of a hollow cylinder having two open ends,
   wherein said sorption member is at least substantially immersed in said flowing stream of fluid with each open end in fluid-tight engagement with one of said electrodes,
   wherein one of said electrodes contains an aperture which is surrounded by the end of said sorption member which is in engagement with said one electrode, and
   wherein said compression means is interconnected with the interior of said sorption member by way of said aperture in said one electrode.

5. Apparatus as described in claim 4, wherein said compression means comprises magnetostriction means including
   a tubular member disposed outside of said conduit in fluid-tight engagement with said electrode containing said aperture,
   said tubular member being further arranged with one end surrounding said aperture in said electrode containing said aperture, and
   electrically-actuated means for constricting said tubular member to apply compresion through said aperture to said fluid in said sorption member.

6. Apparatus as described in claim 5, wherein said electrically-actuated means for constricting said tubular member comprises
   an electrical winding disposed about said tubular member to provide constriction of said tubular member in response to an electrical signal, and an electrical pulse generating means connected to said electrical winding.

7. Apparatus as described in claim 5, wherein said sorption member is a molecular sieve.

8. Apparatus as described in claim 5, said apparatus further comprising means for actuating said pulse generating means during first preselected intermittent time intervals, and means for measuring a function of the capacitance provided by said two electrodes and said sorption member during second preselected different intermittent time intervals.

9. Appaartus as described in claim 8, said apparatus further comprising means for equalizing the pressure in said tubular member, said sorption member, and said conduit formed by said electrodes during said second preselected time intervals.

References Cited

UNITED STATES PATENTS

| | | | |
|---|---|---|---|
| 2,107,406 | 2/1938 | Wood | 210—412 |
| 2,367,935 | 1/1945 | Franck | 210—412 |
| 2,976,728 | 3/1961 | Brogan et al. | 73—61.1 |
| 3,257,842 | 6/1966 | Lerner | 73—61.1 |

CHARLES A. RUEHL, Primary Examiner

J. R. FLANAGAN, Assistant Examiner

U.S. Cl. X.R.

73—73